United States Patent [19]

Aoki

[11] 4,264,160

[45] Apr. 28, 1981

[54] FOCUS INDICATING DEVICE IN A CAMERA

[75] Inventor: Harumi Aoki, Kiyose, Japan

[73] Assignee: Asahi Kogaku Kogyo Kabushiki Kaisha, Tokyo, Japan

[21] Appl. No.: 60,107

[22] Filed: Jul. 24, 1979

[30] Foreign Application Priority Data

Aug. 23, 1978 [JP] Japan .................................. 53/102523

[51] Int. Cl.³ .......................... G03B 3/00; G03B 17/20
[52] U.S. Cl. ....................................... 354/25; 354/53; 354/60 E
[58] Field of Search ................... 354/25, 53, 195, 198, 354/60 E; 352/140; 355/56

[56] References Cited

U.S. PATENT DOCUMENTS 4,171,885  10/1979  Kondo .................................. 354/25
4,178,098  12/1979  Asano et al. ......................... 354/25 X
4,180,309  12/1979  Miyata et al. .......................... 354/25
4,183,642  1/1980  Fukuoka ................................ 354/25

Primary Examiner—Michael L. Gellner
Attorney, Agent, or Firm—Sughrue, Rothwell, Mion, Zinn and Macpeak

[57] ABSTRACT

A focus indicating device in a camera employing a photoelectric transducer for scanning the image of an object to output a time series signal equivalent to the brightness distribution of the image. A contrast detection circuit extracts a power spectrum in a high spatial frequency range which becomes a contrast signal of the image. An indication meter indicates the contrast signal directly in the view finder of the camera with the deflection angle indicating a maximum value when proper focus is obtained.

8 Claims, 3 Drawing Figures

FOCUS INDICATING DEVICE IN A CAMERA

BACKGROUND OF THE INVENTION

This invention relates to a focus indicating device which operates to indicate the contrast signal of the image of an object directly in the view-finder of a camera thereby to indicate the state of focusing.

A variety of focus detecting methods have been proposed. A so-called automatic focusing range finder type camera in which the lens is automatically moved to the focus position has been provided and is known in the art. However, an automatic focusing single-lens reflex camera has not yet been put in practical use. The main reason for this is that, since a single-lens reflex camera is considered to be used for professional photography, there is a strict requirement that the focus position is detected with high accuracy. Manual focus techniques are used and since the lens of the single-lens reflex camera is relatively heavy, the lens drive device is bulky. Also, since the lenses are interchangeable, a motor drive for each lens is not economical. In addition, in order to stop the lens at the focus position, it is necessary to first decide whether the lens is ahead or behind the focus position. The decision processing circuit is accordingly located in the camera body, for use with all lenses and is relatively intricate. These factors make the manufacture of the automatic focusing single-lens reflex camera difficult.

A focus detecting method has been proposed, which utilizes the fact that the optical intensity of each spatial frequency of an object image (the power spectrum) becomes maximum at the focus position. For instance, a method of electrically or mechanically scanning the image of an object by using a photoelectric transducer is known in the art. In this method, a time series scanning output signal equivalent to the brightness distribution of the image of an object is obtained by scanning the image, and then the signal is subjected to differentiation to extract a high frequency component which becomes contrast information. After the differentiation signal is converted into an absolute value waveform, the peak value in one scanning period of the absolute waveform is extracted so as to be utilized as a signal to indicate the state of focusing.

Recently, a method has been proposed in which a self-scanning type photoelectric element is used as the scanning means. A focus indicating device according to this method can be readily incorporated in a single-lens reflex camera, because it can be made compact in view of the employment of the self-scanning type photoelectric element. The above described peak value reaches a maximum when the proper focus is obtained. However, it is necessary to provide a detector for deciding that the peak value is at a maximum, in order to stop the lens at the focus position. For this purpose, heretofore two photoelectric elements are disposed before and behind the focal plane on the optical axis. Alternately, a memory circuit is used to subject to comparison two signals corresponding to two lens positions ahead and behind the focal plane.

SUMMARY OF THE INVENTION

An object of this invention is to provide a simple device in which, according to a focus detecting method of extracting the contrast of the image of an object, instead of using the above-described troublesome lens driving mechanism, the contrast signal is applied directly to a pointer type meter in the finder. Hence, the photographer can detect the focalization position where the peak value becomes maximum, by observing the movement of the pointer of the meter.

The focus indicating device according to the invention positively utilizes the fact that the human eye can detect even a small deflection angle of the pointer of a meter and the position where the pointer shows the maximum deflection angle. Thus, a primary feature of the invention is that a considerably high focus detection accuracy required for the single-lens reflex camera can be obtained by the use of the focus detecting device according to the invention.

One embodiment of this invention will be described with reference to the accompanying drawing and the description of the preferred embodiment that follows.

DESCRIPTION OF THE PREFERRED EMBODIMENT

Figure 1:
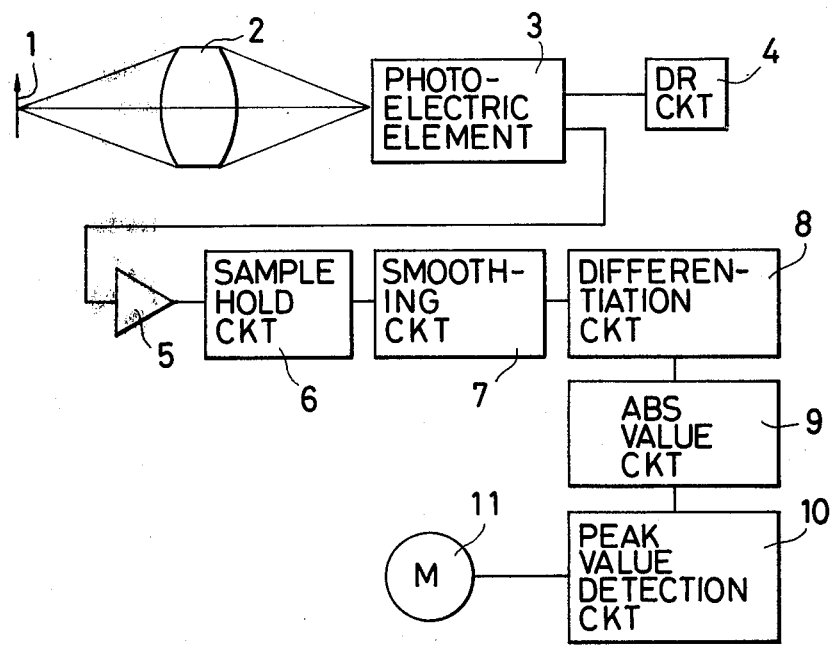
FIG. 1 is a block diagram showing one example of a focus indicating device according to this invention.

FIG. 1 shows one example of a focus indicating device according to the invention. The image of an object 1 is formed on a self-scanning type photoelectric element 3 with the aid of a lens 2. The self-scanning type photoelectric element 3 is driven by a drive circuit 4 to electrically scan the brightness distribution of the object image. It forms a discrete time series photoelectric waveform. This time series waveform is amplified by an amplifier 5, and is then converted into an analog waveform by a sample and hold circuit 6. The unwanted harmonic components of the analog waveform are eliminated by a smoothing circuit 7. As a result, the analog waveform is corrected into the same waveform as that of the object image's brightness distribution.

The waveform output by the smoothing circuit 7 is subjected to differentiation in a differentiation circuit 8. The information of the high spatial frequency of the object is therefore obtained. Then, the differentiation waveform is converted into an absolute value waveform by an absolute value circuit 9, so that both positive and negative signals are detected. A peak value detection circuit 10 detects the peak value of the absolute value waveform in one scanning period and holds the voltage value until the peak voltage value in the next scanning period is provided. If the voltage value thus held is high, then the pointer of a pointer type meter is significantly deflected. If it is low, then the deflection angle of the pointer is small.

Figure 2:
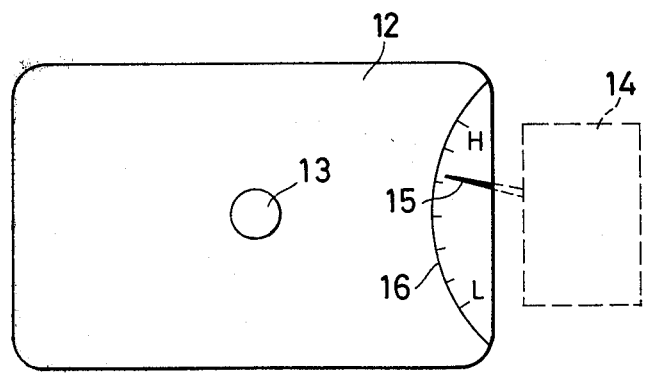
FIG. 2 is an explanatory diagram showing one example of a view finder employed in the focus indicating device according to the invention.

FIG. 2 illustrates one example of a view-finder to which the display method according to the invention is applied. A measurement range frame 13 is marked on a finder frame 12. When the edge of the brightness distribution of an object is caught in the measurement range frame 13, then the pointer 15 of the pointer type meter 14 is deflected up and down in the view-finder range. A focus indicating scale 16 is marked on the view-finder frame 12 to measure the amount of deflection of the pointer 15, or to detect the angle of deflection of the pointer 15.

Figure 3:
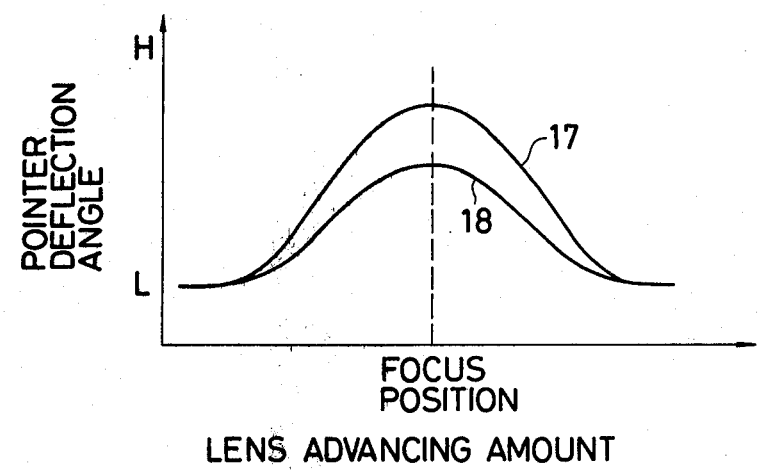
FIG. 3 is a graphical representation indicating the deflection angle of the pointer of a pointer type meter employed in the focus indicating device according to the invention.

The focus detecting operation according to the invention will be described with reference to FIG. 3. First, if the edge of the object's brightness distribution is caught in the measurement range frame 13 of the view finder frame 12, then the position of the lens 2 is adjusted by moving it back and forth. When the lens 2 is set at the focus position, then the pointer (15) of the meter (11 or 14) is deflected to the maximum value as indicated in FIG. 3. When the object contrast is high, the pointer 15 is deflected as indicated by the curve 17 in FIG. 3. When the object contrast is low, the pointer 15 is deflected as indicated by the curve 18 in FIG. 3. Stated differently, the higher the object contrast, the larger the pointer deflection angle.

This means that, as the object contrast is increased, the focus can be readily obtained. However, even when the focus is obtained for an object which is low in contrast, the pointer is deflected to the maximum value, and therefore the lens can be focused on such an object low in contrast. This is an important feature of the present invention.

As is apparent from the above description, according to the invention, the proper focus can be obtained with high accuracy merely by detecting the deflection of the meter pointer to the maximum value. Therefore, the photographer can be free from the conventional troublesome focusing operation. Furthermore, according to the invention, the edge of the object's brightness distribution is detected, and therefore focusing can be achieved also for a relatively deep object.

In the above-described example, the mechanically moving pointer is employed; however, the focus indication can be similarly indicated by using techniques such as a liquid crystal which indicates electro-optically the analog data.

What is claimed is:

1. A focus determination device in a camera, comprising: photoelectric transducing means for scanning the image of an object and producing a time series signal equivalent to the brightness distribution of said image; a contrast detection circuit for extracting a power spectral signal and for producing a contrast signal of said image; and indication means for indicating said contrast signal directly in a view finder of said camera, said contrast detection circuit comprising means to convert said time series signal into an analog waveform, a differentiation circuit for time differentiating said analog waveform to provide a differentiation signal, and an absolute value circuit receiving said differentiation signal to cause the signal from said differentiation circuit to have one polarity, said indicating means being responsive to the output of said absolute value circuit.

2. The focus determination device of claim 1 wherein said photoelectric transducing means comprises a self-scanning photoelectric element and further comprising drive circuit means for electrically scanning brightness distribution of said object image.

3. The focus determination device of claims 1 or 2 further comprising a lens element interposed between said photoelectric transducing means and said object.

4. The focus determining device of claims 1 or 2 further providing a peak value detector for detecting a single peak value of the output of said absolute value circuit during a single analog waveform produced from a single time series, the output of said peak value detecting circuit providing an input to said indicating means.

5. The focus determination device of claims 1 or 2 wherein said means to convert comprises a sample and hold circuit.

6. The focus determination device of claims 1 or 2 wherein said contrast detection circuit further comprises a smoothing circuit to eliminate unwanted harmonic components from said analog wave form.

7. The focus determination device of claims 1 or 2 wherein said indication means comprises an indicating meter having a scale and a needle deflecting in response to said contrast signal.

8. The focus determination device of claims 1 or 2 wherein said indication means comprises an indicating scale and a needle deflecting in response to said contrast signal.

* * * * *